United States Patent [19]
Mehr

[11] Patent Number: 5,927,763
[45] Date of Patent: Jul. 27, 1999

[54] PIPE CONNECTIONS AND METHODS FOR CONNECTING PIPES

[76] Inventor: Ralph R. Mehr, 10 Ruchama Street, Ramat Gan 52107, Israel

[21] Appl. No.: 08/934,219

[22] Filed: Sep. 19, 1997

[51] Int. Cl.[6] ....................................................... F16L 21/08
[52] U.S. Cl. .................. 285/305; 285/382.1; 285/382.2; 29/505
[58] Field of Search ................................ 285/305, 382.1, 285/382.2; 29/505, 515

[56] References Cited

U.S. PATENT DOCUMENTS

| | | | |
|---|---|---|---|
| 4,289,339 | 9/1981 | Hansen | 285/305 |
| 5,779,283 | 7/1998 | Kimura et al. | 285/305 |

Primary Examiner—Anthony Knight
Assistant Examiner—Alison K. Pickard
Attorney, Agent, or Firm—Mark M. Friedman

[57] ABSTRACT

A method for connecting a first end of a cylindrical pipe of given external diameter within a bore of a pipe element having a terminal portion with an internal diameter sufficient to receive the first end, includes outwardly deforming a part of a wall of the terminal portion of the pipe element so as to define an approximately linear open ended channel in a direction roughly tangential to the internal surface of the terminal portion. The first end of the pipe is then positioned within the terminal portion and a pin-like element is forced along the channel. This causes local inward deformation of the first end, thereby locking the first end and the pipe element together. Preferably, an additional part of the wall of the terminal portion is deformed outward to form an annular recess around the interior of the terminal portion for receiving a sealing element.

14 Claims, 2 Drawing Sheets

PIPE CONNECTIONS AND METHODS FOR CONNECTING PIPES

FIELD AND BACKGROUND OF THE INVENTION

The present invention relates to pipes for carrying water and the like and, in particular, it concerns methods for connecting pipes and the corresponding pipe elements and connections.

Various techniques are known for connecting water pipes in fire prevention and domestic water supply systems. For many years, the only alternative to threading or flange connections was a labor intensive welding processes. More recently, a number of quickassembly systems have been marketed. These systems seek to reduce the labor costs of assembly by providing various types of mechanical engagement to hold pipe ends together without requiring welding.

One quick-assembly system of particular interest is disclosed in U.S. Pat. No. 5,040,831 and is available commercially in the U.S. under the tradename POZ-LOK® from Southwestern Pipe, Inc. This system employs specially molded connector fittings which have slots on opposite sides. A pipe is inserted into the connector and a U-shaped bracket is hammered in through the slots. The bracket creates indents in the sides of the pipe, thereby retaining the pipe within the connector.

The POZ-LOK® system has at least two major advantages. Firstly, it is extremely quick and simple to assemble, requiring only a hammer to drive in the brackets. And secondly, the system readily allows disassembly and subsequent reassembly without compromising the joint structure. However, the system is still far from ideal. Precise alignment of the brackets during assembly is ensured by providing a heavy specially produced molded connector. The manufacturing cost of these connectors offsets to a large extent the cost advantages of labor savings. This is true even for iron piping. In the case of the increasingly popular copper piping, the manufacturing costs of such bulky connectors would be unacceptably high.

In order to produce a quickfit system with lower production costs, a number of systems use thin walled connectors which can readily be produced from modified sections of standard piping. An example of such a system is commercially available in the U.S. under the tradename PRESS-FIT™ from VICTAULIC®.

The PRESSFIT™ system employs a thin walled connector with an internal O-ring seal positioned around the end of a pipe. Engagement of the pipe within the connector is achieved using a special hydraulic circumferential press tool which makes a circumferential indent around the joint through both the connector and the pipe, thereby permanently fixing them together.

The PRESSFIT™ system also suffers from a number of disadvantages. Firstly, assembly requires use of an expensive specialized tool which is also very heavy and awkward to handle. Furthermore, the jaws of the tool itself are specific to a given diameter of pipe such that considerable time and labor is required to switch the jaws each time a different gauge of pipe is encountered. Additionally, the joints produced are permanent and can only be dissembled by cutting out and replacing a section of pipe. This renders maintenance and service costs high.

There is therefore a need for a quickfit method for connecting pipes which does not require heavy molded fittings or specialized tools, and which can be non-destructively dissembled for servicing. It would also be advantageous to provide pipe elements and connections corresponding to such methods.

SUMMARY OF THE INVENTION

The present invention is a method for connecting pipes in which mechanical engagement is achieved by insertion of a pin-like element.

According to the teachings of the present invention there is provided, a method for connecting a first end of a cylindrical pipe of given external diameter within a bore of a pipe element having a terminal portion with an internal diameter sufficient to receive the first end, the method comprising: (a) outwardly deforming a part of a wall of the terminal portion of the pipe element so as to define a substantially linear open ended channel in a direction substantially tangential to the internal surface of the terminal portion;

(b) positioning the first end within the terminal portion; and (c) forcing a pin-like element along the channel so as to cause local inward deformation of the first end, thereby locking the first end and the pipe element together.

According to a further feature of the present invention, an additional part of the wall of the terminal portion is outwardly deformed to form an annular recess around the interior of the terminal portion and a sealing element is positioned within the annular recess.

According to a further feature of the present invention, the pipe element may be an adjacent pipe or a pipe connector.

There is also provided according to the teachings of the present invention, a pipe element configured for facilitating connection of a first end of a cylindrical pipe of given external diameter, the pipe element comprising a generally cylindrical terminal portion having an internal diameter sufficient to receive the first end, a part of a wall of the terminal portion being outwardly deformed so as to define a substantially linear open ended channel in a direction substantially tangential to an internal surface of the terminal portion.

According to a further feature of the present invention, an additional part of the wall of the terminal portion is outwardly deformed to form an annular recess around the internal surface.

According to a further feature of the present invention, the terminal portion has an end, the channel being located between the end and the annular recess.

According to a further feature of the present invention, there is also provided a sealing element located within the annular recess.

According to a further feature of the present invention, the terminal portion has a wall thickness, the wall thickness being no more than about 10% of the internal diameter.

According to a further feature of the present invention, the pipe element is an angled connector.

According to a further feature of the present invention, the pipe element is a three-way connector.

There is also provided according to the teachings of the present invention, a pipe connection comprising: (a) the aforementioned pipe element; (b) a cylindrical pipe fitting closely within the terminal portion; and (c) a pin-like element located within the channel and engaging a local depression in an external surface of the cylindrical pipe so as to prevent withdrawal of the cylindrical pipe from the pipe element.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a method for connecting pipes, and corresponding pipe elements and connections.

The principles and operation of methods and pipe elements according to the present invention may be better understood with reference to the drawings and the accompanying description.

Figure 1:
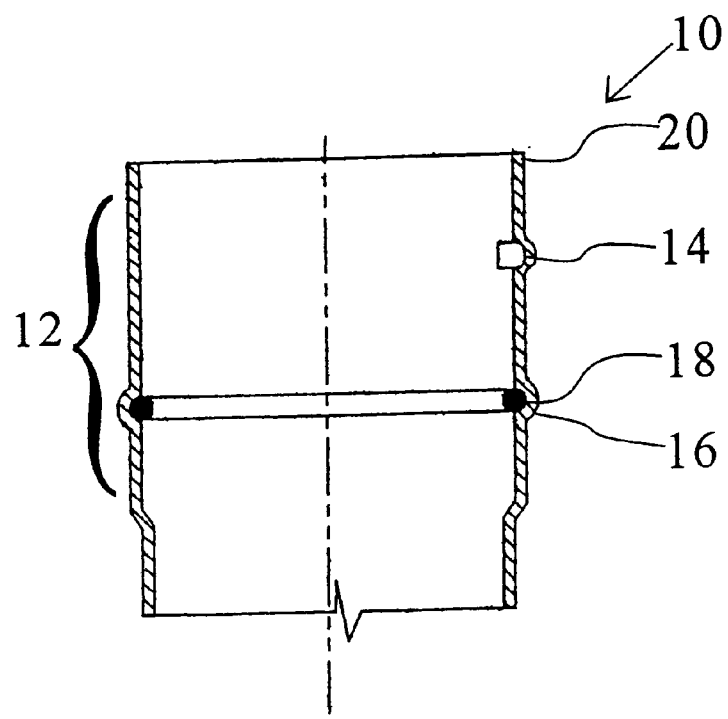
FIG. 1 is a longitudinal cross-sectional view through a pipe element, constructed and operative according to the teachings of the present invention, for receiving a pipe.
Figure 2:
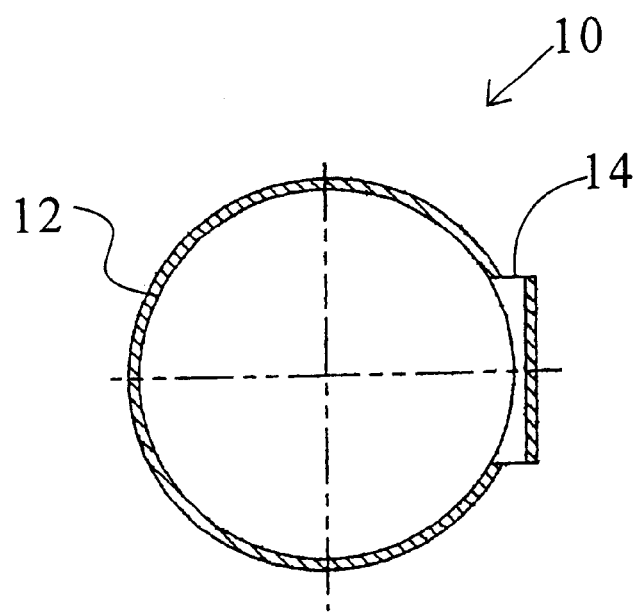
FIG. 2 is a transverse cross-sectional view through the pipe element of FIG. 1.

Referring now to the drawings, FIGS. 1 and 2 show a pipe element 10, constructed and operative according to the teachings of the present invention, for forming a connection with the end of a cylindrical pipe of given external diameter. Generally speaking, pipe element 10 has a generally cylindrical terminal portion 12 which has been broadened so as to have an internal diameter D sufficient to receive the end of a pipe. A part of the wall of terminal portion 12 is outwardly deformed so as to define a substantially linear open ended channel 14 in a direction substantially tangential to the cylindrical internal surface of terminal portion 12.

Channel 14, the main defining feature of the present invention, may take a wide range of forms. It defines a path of insertion for a pin-like locking element along a line described as "substantially tangential" to the cylindrical internal surface of terminal portion 12. "Tangential", in this context, is used to refer to a line tangential to the circular cross-section taken perpendicular to the longitudinal axis of the cylindrical internal surface. The line is described as "substantially" tangential in that it may be radially displaced outwards from the actual circle of the internal surface. Channel 14 may also be angled out of the plane of the cross-section by up to about 20° without adversely affecting its operation.

Channel 14 is open ended, i.e., it has at least one and typically both ends open, to provide an accessible path for insertion of the pin-like locking element. The openings do not, however, have to correspond to the full thickness of the locking element since the pin-like form of the element will enable it to open up its own path as it is forcefully inserted.

Preferably, an additional part of the wall of the terminal portion is outwardly deformed to form an annular recess 16 around the internal surface for receiving an O-ring sealing element 18. For reasons that will become clear, channel 14 is located between the end 20 of terminal portion 12 and annular recess 16.

It will be appreciated that terminal portion 12 with the required features may readily be produced in the end of a pipe element equivalent to the pipe with which it is to be connected. Firstly, the diameter of terminal portion 12 is increased sufficiently to form the required diameter to function as a socket for receiving another pipe end. Then, annular recess 16 and channel 14 are formed. The techniques for increasing the diameter and for forming an annular recess are well known, typically involving heating followed by application of pressure with an appropriately shaped clamping tool. According to the teachings of the present invention, channel 14 can be formed in a similar manner by use of a clamping tool with a straight-edged projection. The cross-section of the projection, and hence of channel 14, is not critical, but is typically either rounded or V-shaped.

Production of the required features in terminal portion 12 may be divided in different ways between a manufacturing stage and the installation procedure. At one extreme, the entire process of broadening, forming annular recess 16 and forming channel 14 could be performed on-site during installation. This option would allow the ends of long pipe sections to be connected directly without requiring the use of additional connector elements. Alternatively, pipe elements 10 could be produced and supplied ready for use without further adaptation.

Since terminal portion 12 is preferably formed from a section of pipe, the wall thickness of terminal portion 12 is typically no more than about 10% of the internal diameter. Thus the quantities of material needed for the connection are not a significant addition to the overall costs of pipe installation. Furthermore, the production costs of pipe element 10 are extremely low, requiring only straightforward adaptation of an otherwise standard pipe end.

The aforementioned economy of material is particularly important in the context of copper piping, as mentioned earlier. Since all fittings must be made of compatible metals to avoid rapid corrosion of the piping, the heavy molded fittings of the prior art are prohibitively expensive. In contrast, the present invention provides pipe elements for forming connections which require nominal additional cost for materials.

Clearly, the present invention may be employed for a simple pipe-to-pipe connection, or for angle joints and multiple-pipe junctions. The term "pipe element" is used generically herein in the description and claims to refer to an element for attachment to form a connection in any of these cases. Thus, the pipe element may be a regular length of pipe, an adapter between different gauge pipes, an angled connector of any angle, or a three-way or four-way connector. Where two or more connections are made by a single pipe element, the pipe element may be provided with a number of terminal portions each according to the present invention.

Figure 3:
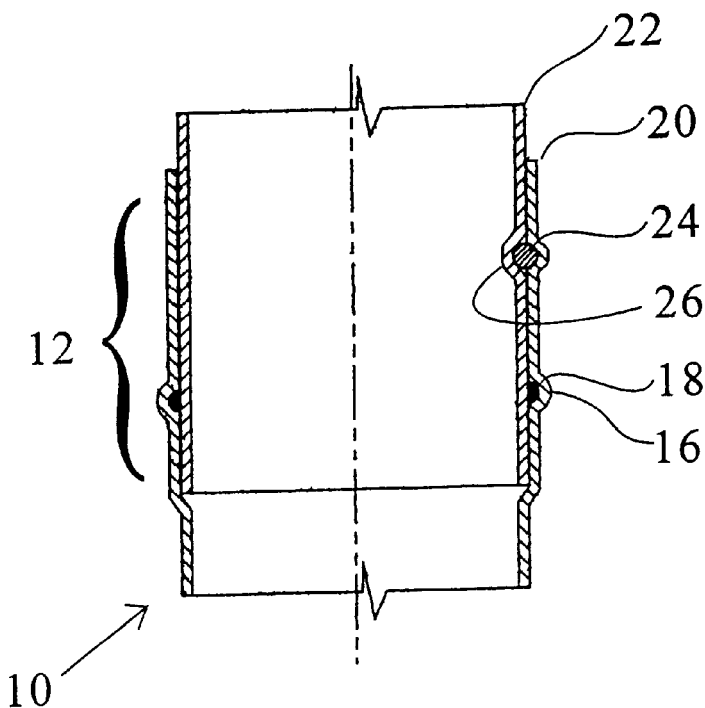
FIG. 3 is a longitudinal cross-sectional view through a pipe connection, constructed and operative according to the teachings of the present invention, employing the pipe element of FIG. 1.
Figure 4:
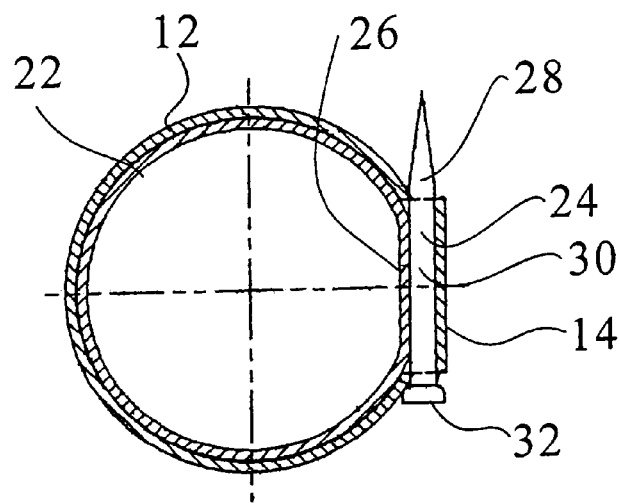
FIG. 4 is a transverse cross-sectional view through the pipe connection of FIG. 3.

Turning now to FIGS. 3 and 4, these illustrate the formation of a connection using pipe element 10. First, the adjacent end of a pipe 22 is inserted into terminal portion 12 to its full extent of travel such that O-ring sealing element 18 forms a seal between pipe 22 and pipe element 10. A pin-like element 24 is then forced along channel 14, typically by being struck a number of times with a hammer, so as to be forced along channel 14 between pipe 22 and pipe element 10. This causes local inward deformation 26 of pipe 22, thereby locking pipe 22 and pipe element 10 together.

As with all fittings for metal pipes, pin-like element 24 should be made of chemically compatible materials. For copper piping, bronze may be used. For iron pipes, a steel pin is suitable.

Element 24 is described as "pin-like" in that it is a simple, straight, somewhat sharp element. Pin-like element 24 preferably has a pointed or wedge-shaped end 28. This helps to guide element 24 along channel 14 and exerts gradually increasing deforming force against the wall of pipe 22. The main body 30 of element 24 is preferably roughly cylindrical so as to act as a uniform locking element. A slightly enlarged head 32 preferably serves to prevent over-insertion and to facilitate removal of element 24, if required. In most cases, various types of nails already commercially available provide all of the preferred features of element 24.

Disassembly of the connection for maintenance and inspection may be achieved easily and nondestructively by knocking and/or prizing out element 24 and pulling pipe 22 and pipe element 10 apart. Similarly, the connection can be reassembled in the same way as originally formed.

It will be noted that, unlike the POZ-LOK® system described above, the present invention creates a local deformation on only one side of pipe 22. It has been found that this onesided locking is sufficient to effectively retain the connection together up-to and beyond all required standards.

As mentioned earlier, annular recess 16 is further removed from end 20 of terminal portion 12 than channel 14. This ensures that the openings of channel 14 are external to the seal formed by O-ring element 18 between pipe 22 and pipe element 10.

It will be appreciated that the above descriptions are intended only to serve as examples, and that many other embodiments are possible within the spirit and the scope of the present invention.

What is claimed is:

1. A method for connecting a first end of a cylindrical pipe of given external diameter within a bore of a pipe element having a terminal portion with an internal diameter sufficient to receive the first end, the method comprising:
   (a) outwardly deforming a part of a wall of the terminal portion of the pipe element so as to define a substantially linear open ended channel in a direction substantially tangential to the internal surface of the terminal portion;
   (b) positioning the first end within the terminal portion; and
   (c) forcing a pin-like element along said channel so as to cause local inward deformation of the first end, thereby locking the first end and the pipe element together.

2. The method of claim 1, further comprising outwardly deforming an additional part of the wall of the terminal portion to form an annular recess around the interior of the terminal portion and positioning a sealing element within said annular recess.

3. The method of claim 2, wherein the terminal portion has an end, said annular recess being further removed from said end than said channel.

4. The method of claim 1, wherein the pipe element has a wall thickness approximately similar to a wall thickness of the first end.

5. The method of claim 1, wherein the pipe element is an adjacent pipe.

6. The method of claim 1, wherein the pipe element is a pipe connector.

7. A pipe element configured for facilitating connection of a first end of a cylindrical pipe of given external diameter, the pipe element comprising a generally cylindrical terminal portion having an internal diameter sufficient to receive the first end, said terminal portion having a wall of thicknesss no more than about 10% of said internal diameter, a part of said wall being outwardly deformed so as to define a substantially linear open ended channel in a direction substantially tangential to an internal surface of said terminal portion.

8. The pipe element of claim 7, wherein an additional part of said wall of said terminal portion is outwardly deformed to form an annular recess around said internal surface.

9. The pipe element of claim 8, wherein said terminal portion has an end, said channel being located between said end and said annular recess.

10. The pipe element of claim 9, further comprising a sealing element located within said annular recess.

11. The pipe element of claim 7, wherein the pipe element is an angled connector.

12. The pipe element of claim 7, wherein the pipe element is a three-way connector.

13. A pipe connection comprising:
   (a) the pipe element of claim 7;
   (b) a cylindrical pipe fitting closely within said terminal portion; and
   (c) a pin-like element located within said channel and engaging a local depression in an external surface of said cylindrical pipe so as to prevent withdrawal of said cylindrical pipe from said pipe element.

14. The pipe element of claim 7, wherein said terminal portion is integrally formed with a pipe portion, said pipe portion having an external diameter equal to said external diameter of said first end of said cylindrical pipe.

* * * * *